(12) United States Patent
Jones et al.

(10) Patent No.: US 11,680,019 B2
(45) Date of Patent: Jun. 20, 2023

(54) GYPSUM-BASED PANEL

(71) Applicant: Saint-Gobain Placo SAS, Suresnes (FR)

(72) Inventors: Nicholas Jones, Coventry (GB); Adam Richardson, Coventry (GB); Jan Rideout, Coventry (GB); Laura Brooks, Coventry (GB); Joanna Sparkes, Coventry (GB); David Jalland, Coventry (GB); Nicola Jupp, Coventry (GB)

(73) Assignee: Saint-Gobain Placo SAS, Courbevoie (FR)

( * ) Notice: Subject to any disclaimer, the term of this patent is extended or adjusted under 35 U.S.C. 154(b) by 0 days.

(21) Appl. No.: 16/091,735

(22) PCT Filed: Apr. 6, 2017

(86) PCT No.: PCT/GB2017/050962
§ 371 (c)(1),
(2) Date: Oct. 5, 2018

(87) PCT Pub. No.: WO2017/174991
PCT Pub. Date: Oct. 12, 2017

(65) Prior Publication Data
US 2019/0152855 A1 May 23, 2019

(30) Foreign Application Priority Data

Apr. 8, 2016 (GB) .................................... 1605998
May 20, 2016 (GB) .................................... 1608968
May 25, 2016 (GB) .................................... 1609248

(51) Int. Cl.
| | | |
|---|---|---|
| C04B 28/14 | (2006.01) | |
| E04C 2/04 | (2006.01) | |
| E04C 2/06 | (2006.01) | |
| C04B 14/06 | (2006.01) | |
| C04B 14/28 | (2006.01) | |
| C04B 14/42 | (2006.01) | |
| C04B 16/06 | (2006.01) | |
| C04B 24/38 | (2006.01) | |
| C04B 111/00 | (2006.01) | |
| C04B 111/10 | (2006.01) | |

(52) U.S. Cl.
CPC .............. *C04B 28/14* (2013.01); *C04B 14/06* (2013.01); *C04B 14/28* (2013.01); *C04B 14/42* (2013.01); *C04B 16/0675* (2013.01); *C04B 24/383* (2013.01); *E04C 2/043* (2013.01); *E04C 2/06* (2013.01); *C04B 2111/0062* (2013.01); *C04B 2111/1006* (2013.01); *Y02W 30/91* (2015.05)

(58) Field of Classification Search
CPC ......... C04B 28/14; C04B 14/06; C04B 14/28; C04B 14/42; C04B 16/0675; C04B 24/383; E04C 2/043; E04C 2/06
See application file for complete search history.

(56) References Cited

U.S. PATENT DOCUMENTS

| | | |
|---|---|---|
| 2009/0053544 A1 | 2/2009 | Sethuraman |
| 2009/0209681 A1 | 8/2009 | Adzima et al. |

FOREIGN PATENT DOCUMENTS

| | | |
|---|---|---|
| CN | 105082353 | 11/2015 |
| GB | 870937 | 6/1961 |
| GB | 1432157 | 4/1976 |
| JP | 2002070239 A | 3/2002 |
| WO | WO 2006/113379 | 10/2006 |
| WO | WO 2014/188168 | 11/2014 |
| WO | WO 2016/079528 | 5/2016 |
| WO | WO 2016/079530 | 5/2016 |

OTHER PUBLICATIONS

International Search Report dated Nov. 23, 2016 for Great Britain Application No. GB1609248.8, 2 pages.
International Search Report and Written Opinion for International Application No. PCT/GB2017/050962 dated Jul. 21, 2017, 12 pages.
V. Thole "Strength and bonding properties of polymer-modified hardened gypsum plaster," ZKG International—Zement—Kalk—GIPS Interantional, 52(7), 400-409 (1999).

*Primary Examiner* — John E Uselding
(74) *Attorney, Agent, or Firm* — McDonnell Boehnen, Hulbert & Berghoff LLP

(57) ABSTRACT

A panel has a gypsum matrix, in which the following additives are embedded: glass fibre in an amount greater than 1 wt % relative to the gypsum and a synthetic polymeric binder in an amount greater than 2.5 wt % relative to the gypsum. The glass fibre and synthetic polymeric binder are present in a weight ratio of at least 2 parts binder to one part fibre. The amount of sand present in the gypsum matrix lies in the range 0-0.5 wt % relative to the gypsum. The amount of cellulosic fibre present in the gypsum matrix lies in the range 0-2 wt % relative to the gypsum.

16 Claims, No Drawings

GYPSUM-BASED PANEL

CROSS REFERENCE TO RELATED APPLICATIONS

This application is a national stage entry under 35 U.S.C. 371 of International Patent Application no. PCT/GB2017/050962, filed Apr. 6, 2017, which claims the benefit of priority of United Kingdom Patent Applications nos. 1605998.2, filed Apr. 8, 2016; 1608968.2, filed May 20, 2016, and 1609248.8, filed May 26, 2016.

FIELD OF THE INVENTION

The present invention relates to the field of gypsum-based materials, more specifically to the field of gypsum-based panels.

BACKGROUND TO THE INVENTION

Light-weight panels such as plasterboard (e.g. gypsum plasterboard), polystyrene board and fibreboard are commonly used to provide partitions within buildings. Their advantages for this application include the fact that they are light and quick to install.

However, in certain cases, such light-weight panels may have the drawback that they are not strong enough to support fixtures (e.g. sinks, televisions, radiators, fire extinguishers, shelves and any other item that requires attachment to the panel). In such cases, the weight of the fixture may cause the fixing means (e.g. screws) to be pulled out of the panel, such that the fixture falls away from the partition.

Typically, this problem has been addressed by providing plywood sheets to increase the fixing strength of the panel. In this case, the plywood sheet is provided on the side of the panel opposite to that on which the fixture is to be located. The plywood sheet may provide increased strength for retaining one or more fixing means (e.g. screws) employed to secure the fixture to the panel. Typically, the plywood sheet is positioned within the partition framework, and the plasterboard then fixed to the plywood, so that it lies outside the partition framework.

As an alternative, metal support means may be provided. These may comprise fixing plates, channels, straps, or metal fasteners. As is the case for plywood sheets, the metal support means are generally positioned on the side of the panel opposite that to which the fixture is to be secured, and act to receive and secure fixing means, e.g. fixing screws, that are used to attach the fixture to the panel.

Both these arrangements have the disadvantage that they require the panels and the additional supporting components to be affixed to each other on-site. Moreover, when metal support means are used, a plurality of such support means may be needed to support the full set of fixing means required to secure the fixture to the panel. Thus, the installation process may be time-consuming and expensive.

Furthermore, the addition of metal support means or plywood sheets increases the weight and thickness of the partition, and/or results in a reduction in cavity wall space. In general, the plywood itself must be cut to size on site, thus increasing the time required for installation and possibly leading to the release of dust and potentially harmful components.

Therefore, there is a need to provide improved panels that are able to retain fixing means and support fixtures, and that do not require time-consuming installation processes.

It is known (for example from WO2014/188168) to include fibres and/or polymeric additives in gypsum slurry to increase the fixing strength of the resultant gypsum product.

Previous developments have resulted in increased fixing strength of gypsum boards, but there is still a need for further improvement in performance, or to maintain performance at reduced board weight and/or thickness. For example, it may be desirable to reduce board weight and/or thickness by 30-50% while maintaining fixing strength.

SUMMARY OF THE INVENTION

Surprisingly, it has now been found that significant increases in gypsum strength are achieved when fibre and polymeric additives are incorporated into a gypsum-based product in unequal amounts. Specifically, it has been found that benefits may be achieved by limiting the amount of fibre incorporated into the gypsum-based product, such that the polymeric additive is incorporated into the gypsum-based product in significantly greater amounts than the fibre additive.

Therefore, in a first aspect, the present invention may provide a panel having a gypsum matrix, the gypsum matrix having the following additives embedded therein:
  glass fibre in an amount greater than 1 wt % relative to the gypsum;
  a synthetic polymeric binder in an amount greater than 4 wt % relative to the gypsum;
  the glass fibre and synthetic polymeric binder being present in a weight ratio of at least 2 parts binder to one part fibre;
    wherein the amount of sand present in the gypsum matrix lies in the range 0-0.5 wt % relative to the gypsum;
    and further wherein the amount of cellulosic fibre present in the gypsum matrix lies in the range 0-10 wt % relative to the gypsum.

Preferably, the polymeric binder is polyvinyl acetate.

Preferably, the amount of acrylic resin present in the gypsum matrix lies in the range 0-1 wt % relative to the gypsum. In general, the gypsum matrix is substantially free from acrylic resin.

Preferably, the amount of calcium carbonate present in the gypsum matrix lies in the range 0-5 wt % relative to the gypsum, more preferably 0-1 wt % relative to the gypsum. In general, the gypsum matrix is substantially free from calcium carbonate.

In general, the gypsum matrix is substantially free from sand.

Preferably, the amount of cellulosic fibre present in the gypsum matrix lies in the range 0-1.5 wt % relative to the gypsum, more preferably 0-1 wt %. In general, the gypsum matrix is substantially free from cellulosic fibre. The term "cellulosic fibre" is intended to refer both to fibres that are provided within wood particles (such as wood chip and fine sawdust particles) and to fibres that are no longer bound by the natural binders present in wood. Therefore, for the avoidance of doubt, the amount of wood particles present in the gypsum matrix lies in the range 0-2 wt % relative to the gypsum, preferably in the range 0-1.5 wt %, more preferably in the range 0-1 wt %.

Preferably, the total weight of the additives embedded in the gypsum matrix is less than the weight of the gypsum in the gypsum matrix. That is, gypsum is preferably the principal component of the panel by weight.

Preferably, the polymeric binder is present in an amount greater than 3.5 wt %, preferably greater than 4 wt %, most preferably greater than 5 wt % relative to the gypsum. It has been found that the addition of polymeric binder results in continued improvements to mechanical properties, at least up to levels of about 25 wt % binder relative to the gypsum. Thus, in view of the relatively high cost of synthetic polymeric binders, it is generally preferred that the levels of synthetic polymeric binder should be 25 wt % or less relative to the gypsum.

The glass fibres embedded in the gypsum matrix were originally added to the gypsum slurry used to form the panel. Thus they are dispersed throughout the gypsum matrix, preferably in a substantially even distribution.

Preferably the glass fibre is present in an amount greater than 1.5 wt % relative to the gypsum. However, it is thought that high levels of fibre give rise to difficulties in the production of the panel, for example, due to the formation of voids. Furthermore, the presence of fibres is considered to increase the force required for scoring and snapping panels to separate them. Therefore, the glass fibre is preferably present in an amount of less than 6 wt % relative to the gypsum.

Preferably, the glass fibres have an average length in the range 3-10 mm.

Preferably, the glass fibres have an average diameter in the range 5-50 micron.

Preferably, the glass fibre and polymeric binder are present in a weight ratio of at least 2.5 parts binder to one part fibre, preferably at least 3 parts binder to one part fibre, preferably at least 4 parts binder to one part fibre.

In certain embodiments, the panel may be substantially free of starch. In other embodiments, the panel may contain both synthetic polymer and starch, the starch being present in a lesser amount than the synthetic polymer, preferably in an amount of less than 5 wt % relative to the amount of synthetic polymer, more preferably less than 3 wt % relative to the amount of synthetic polymer.

Typically, gypsum matrix does not include any fibres other than glass fibres. However, in the case that the gypsum matrix does include non-glass fibres, the average length of the non-glass fibres is preferably at least 50% of the average length of the glass fibres, more preferably at least 80%.

In general, the panel is provided with facings on one or both sides. The facings may be e.g. paper facings, which may comprise cellulose and optionally glass fibres. Alternatively, the facings may be provided by a mat partially or fully embedded at the surface of the panel, for example, a glass fibre mat.

The inclusion of synthetic polymer to strengthen the panel, rather than starch, may have one or more of the following advantages:
  the panel dries more quickly during production, leading to faster manufacturing speeds;
  the finished panel shows less dimensional variation with changing humidity.

Preferably, the panel has a thickness in the range 6-20 mm, more preferably 10-16 mm.

Preferably, the panel has a density in the range 600-1400 kg/m$^3$, more preferably in the range 700-1200 kg/m$^3$.

In a second aspect, the present invention may provide a method of making a panel according to the first aspect of the invention, comprising the steps of providing a stucco slurry comprising glass fibres and a synthetic polymeric binder, and allowing the slurry to set,
  wherein the amount of lime present in the slurry lies in the range 0-0.5 wt %; and further wherein the step of providing the stucco slurry comprises adding water to stucco in an amount that is less than twice the weight of the stucco.

In general, the slurry is substantially free from lime.

Preferably, water is added to the stucco in an amount that is less than 1.5 times the weight of the stucco.

The panel prepared through the method of the second aspect of the invention may comprise one or more optional features of the panel according to the first aspect of the invention.

DETAILED DESCRIPTION

The invention will now be described by way of example only.

Gypsum plasterboards were prepared from gypsum slurries, according to the following method:
1. Polyvinylacetate (Vinamul 8481 from Celanese Emulsions) is added to water to form an aqueous suspension;
2. Glass fibres are mixed into the aqueous suspension;
3. Stucco is added to the aqueous suspension to form a slurry;
4. The slurry is mixed in a Kenwood Blender® at minimum speed for 10 seconds;
5. The speed in increased and the slurry mixed further for 20 seconds;
6. The slurry is deposited on a forming surface to form a board;
7. The board is dried at a temperature of 160° C. for one hour, and further at a temperature of 40° C. until a constant weight is reached;
8. The board is conditioned at 23° C. and a relative humidity of 50% until a constant weight is achieved.

The composition of the slurries and the densities of the boards are detailed in Table 1.

Polyvinylacetate is added to the slurry in the form of an aqueous suspension. The amount of polyvinylacetate set out in Table 1 refers to the amount of polyvinylacetate contained within the aqueous suspension, rather than the total mass of the suspension added to the slurry.

TABLE 1

|  | Slurry composition (g) | | | | Board density (kg/m$^3$) |
| --- | --- | --- | --- | --- | --- |
|  | Stucco | Glass fibre | Polymer | Water |  |
| Example 1 | 1050 | 21 | 52.5 polyvinylacetate | 787.5 | 951.1 |
| Example 2 | 1050 | 21 | 157.5 polyvinylacetate | 682.5 | 953.9 |
| Example 3 | 1050 | 21 | 262.5 polyvinylacetate | 577.5 | 959.7 |
| Comparative example 1 | 1050 | 21 | 52.5 starch | 840 | 965.7 |
| Comparative example 2 | 1050 | 21 | 52.5 starch | 840 | 929.62 |
| Comparative example 3 | 1050 | 52.5 | 52.5 starch | 840 | 975.76 |
| Comparative example 4 | 1050 | 21 | 0 | 840 | 980.04 |
| Example 4 | 1050 | 21 | 52.5 polyvinylacetate | 787.5 | 970.12 |

TABLE 1-continued

| | Slurry composition (g) | | | | Board density (kg/m³) |
|---|---|---|---|---|---|
| | Stucco | Glass fibre | Polymer | Water | |
| Example 5 | 1050 | 21 | 105 polyvinylacetate | 735 | 953.68 |
| Example 6 | 1050 | 21 | 157.5 polyvinylacetate | 682.5 | 960.53 |
| Example 7 | 1050 | 21 | 210 polyvinylacetate | 630 | 946.44 |
| Example 8 | 1050 | 21 | 262.5 polyvinylacetate | 577.5 | 954.24 |
| Comparative example 5 | 1050 | 21 | 52.5 starch | 945 | 886.0 |

Screw Pull-Out Tests

Screw pull-out tests were carried out on samples measuring 100 mm by 100 mm that had been conditioned at a temperature of 23° C. and a relative humidity of 50%. A 50 mm single thread wood screw was inserted into the sample using a torque screwdriver, the screw passing through a metal load transfer element positioned on the surface of the sample. The load transfer element has a first portion that is configured to lie between the screw head and the surface of the sample, and a second portion that is configured to engage with a testing machine so as to allow a load to be applied to the screw along the axis of the screw.

The specimen was then mounted in a Zwick Universal Testing Machine and a 10N pre-load applied to the screw along the axis of the screw. Subsequently, the load was increased by setting a constant cross-head speed of 10 mm/minute until pull out was achieved.

Refix Pull-Out Tests

Refix pull-out tests were carried out using the same protocol as the screw pull-out tests, with the additional step, immediately after the step of inserting the screw into the sample using a torque screwdriver, of removing the screw and reinserting it in the same position using the torque screwdriver.

Fatigue Tests

Fatigue tests were carried out using the same protocol as the screw pull-out tests, with the additional step, between the steps of applying a 10N pre-load to the screw and setting a cross-head speed of 10 mm/minute, of applying 100 loading cycles between 10N and 300N at a cross-head speed of 10 mm/minute.

Hand Torque Tests

Hand torque tests were carried out on samples measuring 100 mm by 100 mm that had been conditioned at a temperature of 23° C. and a relative humidity of 50%. A 50 mm single thread wood screw was inserted into the sample using a screw gun, the screw passing through a steel washer positioned on the surface of the sample.

The screw gun was configured to cut out when the screw had been inserted into the sample to such a depth that the head protruded by 10 mm from the sample. The screw was then turned using a torque-controlled manual screwdriver until a sharp increase in the torque reading was observed, as the screw head came into contact with the sample. Using the manual screwdriver, the screw was then turned further in increments of ⅛th of a turn, the torque reading being recorded after each increment and then being re-set to zero. This process was continued until at least 1.5 turns after a maximum torque had been achieved. The maximum torque was then recorded.

The results of mechanical testing are set out in Table 2. The number in brackets indicates the number of samples tested.

TABLE 2

| | Pull out strength (N) | Refix pull out strength (N) | Fatigue (N) | Hand torque (Nm) |
|---|---|---|---|---|
| Example 1 | 772 ± 36 (3) | 650 ± 28 (3) | 681 ± 26 (3) | 2.03 ± 0.15 (3) |
| Example 2 | 1231 ± 82 (3) | 1117 ± 76 (3) | 1237 ± 78 (3) | 2.73 ± 0.46 (3) |
| Example 3 | 1460 ± 19 (3) | 1493 ± 63 (3) | 1490 ± 80 (3) | 3.93 ± 1.1 (3) |
| Comparative example 1 | 614.9 ± 14 (3) | 418.2 ± 74 (3) | 575 ± 69 (3) | 2.47 ± 0.21 (3) |
| Comparative example 2 | 631.30 ± 59 (8) | | | |
| Comparative example 3 | 705 ± 92 (8) | | | |
| Comparative example 4 | 342.5 ± 83 (8) | | | |
| Example 4 | 832.6 ± 69 (8) | | | |
| Example 5 | 1018.4 ± 41 (8) | | | |
| Example 6 | 1239.7 ± 67 (8) | | | |
| Example 7 | 1439.1 ± 123 (8) | | | |
| Example 8 | 1592.6 ± 90 (8) | | | |
| Comparative example 5 | 531.8 ± 75 (8) | | | |

The invention claimed is:

1. A panel having a gypsum matrix, a first facing on a first side of the gypsum matrix, and a second facing on a second opposing side of the gypsum matrix, each of the facings being a paper facing or a fiber mat, the gypsum matrix having the following additives embedded therein:
   glass fibre in an amount greater than 1 wt % and less than 6 wt % relative to the gypsum, distributed throughout the gypsum matrix;
   a synthetic polymeric binder in an amount greater than 2.5 wt % and less than 25 wt % relative to the gypsum;
   the glass fibre and synthetic polymeric binder being present in a weight ratio of at least 2 parts binder to one part fibre;
   wherein the amount of sand present in the gypsum matrix lies in the range 0-0.5 wt % relative to the gypsum;

and further wherein the amount of cellulosic fibre present in the gypsum matrix lies in the range 0-2 wt % relative to the gypsum;

and further wherein the gypsum matrix is the set product of a slurry comprising in the range of 79-93 wt % stucco on a solids basis, and further wherein the amount of acrylic resin present in the gypsum matrix lies in the range 0-1 wt % relative to the gypsum.

2. The panel according to claim 1, wherein the polymeric binder is polyvinyl acetate.

3. The panel according to claim 1, wherein the amount of calcium carbonate present in the gypsum matrix lies in the range 0-1 wt % relative to the gypsum.

4. The panel according to claim 1, wherein the total weight of the additives embedded in the gypsum matrix is less than the weight of the gypsum in the gypsum matrix.

5. The panel according to claim 1, wherein the polymeric binder is present in an amount greater than 3.5 wt % relative to the gypsum.

6. The panel according to claim 1, wherein the glass fibres have an average length in the range 3-10 mm.

7. The panel according to claim 1, wherein the glass fibres have an average diameter in the range 5-50 micron.

8. The panel according to claim 1, wherein the glass fibre and polymeric binder are present in a weight ratio of at least 3 parts binder to one part fibre.

9. The panel according to claim 1, wherein a starch content of the panel is less than 5 wt % relative to the amount of synthetic polymer binder.

10. A method of making the panel according to claim 1, comprising providing a stucco slurry comprising glass fibres and a synthetic polymeric binder, and allowing the slurry to set, wherein the amount of lime present in the slurry lies in the range 0-0.5 wt %;

and further wherein the step of providing a stucco slurry comprises adding water to stucco in an amount that is less than twice the weight of the stucco.

11. The panel according to claim 1, wherein each facing comprises a paper facing.

12. The panel according to claim 1, wherein each facing comprises a mat partially or fully embedded at the surface of the panel.

13. The panel according to claim 1, wherein the glass fibre is dispersed substantially evenly throughout the gypsum matrix.

14. The panel according to claim 1, wherein the gypsum matrix does not include any fibres other than the glass fibres.

15. The panel according to claim 1, wherein the gypsum matrix is substantially free from acrylic resin.

16. The panel according to claim 2, wherein the polyvinyl acetate is the only synthetic resin present in the gypsum matrix.

\* \* \* \* \*